US011769161B1

(12) United States Patent
Navarro et al.

(10) Patent No.: US 11,769,161 B1
(45) Date of Patent: Sep. 26, 2023

(54) SYSTEM AND METHOD FOR GENERATING A MACHINE LEARNING SCRIPT FOR REAL ESTATE PURPOSES

(71) Applicant: Yupix, Inc., Wynwood, FL (US)

(72) Inventors: Patricio Navarro, Wynwood, FL (US); Gonzalo Navarro, Wynwood, FL (US); Alvaro Alesso, Wynwood, FL (US)

(*) Notice: Subject to any disclaimer, the term of this patent is extended or adjusted under 35 U.S.C. 154(b) by 0 days.

(21) Appl. No.: 17/895,903

(22) Filed: Aug. 25, 2022

(51) Int. Cl.
| G06Q 30/02 | (2023.01) |
| G06Q 50/16 | (2012.01) |
| G06T 19/00 | (2011.01) |
| G02B 27/01 | (2006.01) |
| G06Q 30/0201 | (2023.01) |

(52) U.S. Cl.
CPC ....... *G06Q 30/0201* (2013.01); *G02B 27/017* (2013.01); *G06Q 50/16* (2013.01); *G06T 19/006* (2013.01)

(58) Field of Classification Search
CPC .. G06Q 30/0201; G06Q 50/16; G02B 27/017; G06T 19/006
See application file for complete search history.

(56) References Cited

U.S. PATENT DOCUMENTS

| 8,038,613 B2 * | 10/2011 | Stupp | G16H 50/70 600/300 |
| 10,846,937 B2 | 11/2020 | Rogers et al. | |

| 2005/0039206 A1 * | 2/2005 | Opdycke | G06Q 30/0277 725/23 |
| 2015/0269609 A1 * | 9/2015 | Mehanian | G06Q 30/0254 705/14.45 |

(Continued)

FOREIGN PATENT DOCUMENTS

| CN | 106610818 A | * | 5/2017 |
| CN | 107609747 A | * | 1/2018 |

(Continued)

OTHER PUBLICATIONS

Guillermo Aranda-Mena, "VR Live in Architecture: Broadcasting Realtime Virtual Reality," 2021, Proceedings of the CIB International Conference on Smart Built Environment, ICSBE, pp. 129-139. (Year: 2021).*

(Continued)

*Primary Examiner* — Tan D Nguyen
(74) *Attorney, Agent, or Firm* — Sanchelima & Associates PA; Christian Sanchelima; Jesus Sanchelima

(57) ABSTRACT

A system and method for generating a master realtor script to aid marketing and sales of new development properties with manually entered parameters or parameters gathered through machine learning. The system includes a VR headset that is in communication with a server via a communication network. The server includes a database containing preferred parameters of a given user for a real estate option that are either manually entered or generated by a machine learning module. This may include, number of rooms, color, housing type, preferred furniture, family members, house layout, and other parameters. The system will then predict user preferences based on the predetermined parameters and assign a weight to each different type of parameters. Afterwards, a master realtor script is averaged and provided in real time via a virtual reality headset based on the weighted parameters.

3 Claims, 2 Drawing Sheets

(56) References Cited

U.S. PATENT DOCUMENTS

Figure 1:
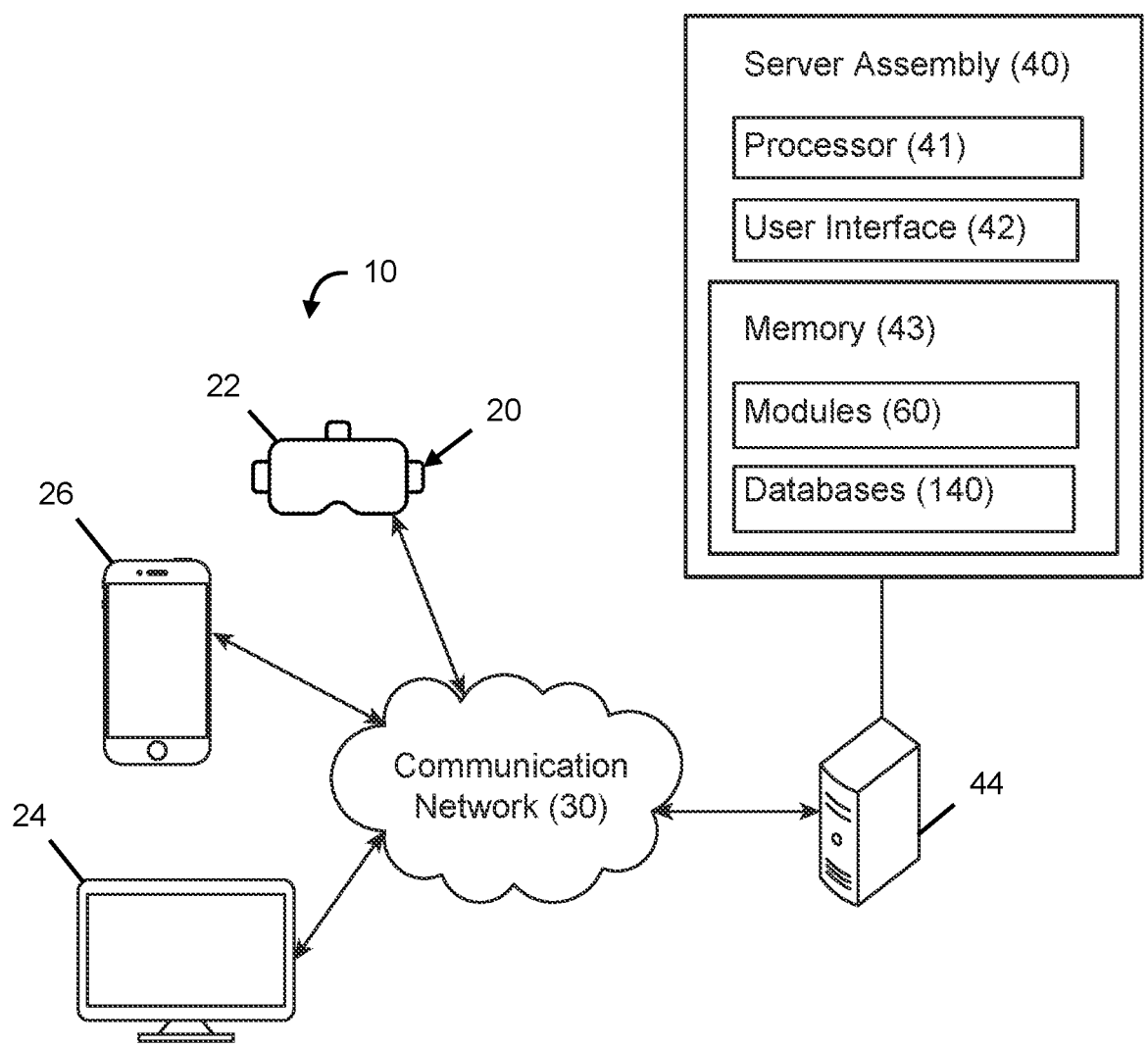

2016/0300392 A1* 10/2016 Jonczyk ................ G06T 19/003
2019/0333174 A1* 10/2019 Jung ...................... G06Q 50/16

FOREIGN PATENT DOCUMENTS

| CN | 109492191 A | * | 3/2019 | |
|----|-------------|---|--------|---|
| WO | WO-0122179 A1 | * | 3/2001 | ............. G05B 17/02 |
| WO | WO-0122182 A1 | * | 3/2001 | ....... G05B 19/41885 |

OTHER PUBLICATIONS

Adam Louie, "Project Ions: Investigating Operative Networks," 2016, Master of Architecture Thesis, pp. 1-20. (Year: 2016).*
Michel Wedel, "Virtual and Augmented Reality: Advancing research in consumer marketing", 2020, International Journal of Research and Marketing, 37, pp. 443-463. (Year: 2020).*

\* cited by examiner

SYSTEM AND METHOD FOR GENERATING A MACHINE LEARNING SCRIPT FOR REAL ESTATE PURPOSES

II. BACKGROUND OF THE INVENTION

1. Field of the Invention

The present invention relates to a system and method for generating a machine learning script for real state purposes and, more particularly, to a system and method for generating a master realtor script to aid marketing with manually entered parameters or parameters entered through machine learning.

2. Description of the Related Art

Several designs for a system and method for generating a script for realtors have been designed in the past. None of them, however, include a system for predicting parameters based on entered user preferences for a given real estate script.

Applicant believes that a related reference corresponds to U.S. Pat. No. 10,846,937 issued for a three-dimensional virtual environment. Applicant believes that another related reference corresponds to U.S. patent application publication No. 2019/0333174 for a system for providing removals simulation using virtual reality and augmented reality and brokering real estate therethrough. None of these references, however, teach of a system that assigns a weight to predicted parameters based on entered user preferences to generate a realtor master script.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a system and method for generating a script for realtors that includes a head mounted display such Virtual Reality, Mixed Reality and Extended Reality headset in communication with a server via a network that contains instructions read by a processor.

It is another object of this invention to provide a system and method for generating a script for realtors that includes a system predicting user parameters based on entered user preferences for a given real estate script.

It is still another object of the present invention to provide a system and method for generating a script for realtors that includes a system assigning a weight to each predicted parameter that has been anticipated by a machine learning module.

It is yet another object of this invention to provide such a tool that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a network connection diagram of the VR, MR, XR, or any HMD headset 22 communicating with a server assembly 40 via a communication network 30.

Figure 2:
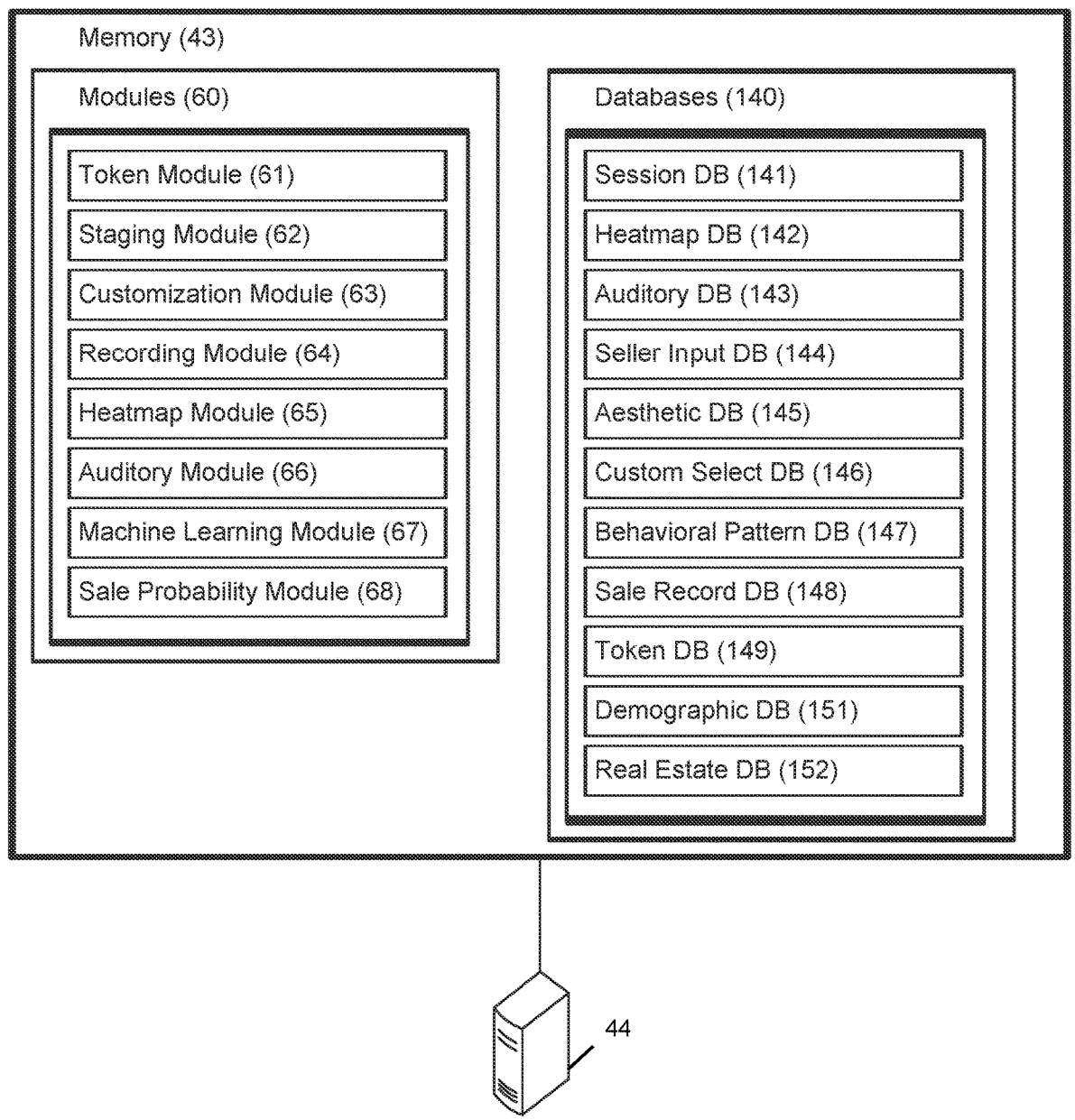

FIG. 2 shows an overview of the databases 140 and content modules 60 stored on memory 43 of the server 44 according to the present embodiment.

V. DETAILED DESCRIPTION OF THE EMBODIMENTS OF THE INVENTION

Referring now to the drawings, where the present invention is generally referred to with numeral 10, it can be observed that it basically includes a hardware assembly 20, a communication network 30, a server assembly 40, modules 60, and databases 140. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Best illustrated in FIG. 1 the hardware assembly 20 may include a headset (Virtual Reality or Extended Reality headset) 22, a computer 24, and a mobile device 26. In one embodiment the VR, MR or XR headset 22 may include any variation of a head mounted display configured to be worn by a user. The headset 22 may also include a microphone 24b and a wired or a wireless connection. It may be suitable to define the computer 24 as a stationary computing device that also includes wired or wireless connection capabilities. The mobile device 26 may include a variety of handheld devices such as a tablet, a mobile phone, a smartphone, a laptop, a smart watch or any device with wireless or wired connection capabilities. The VR headset 22, the computer 24, and the mobile device 26 may be in communication with a server 44 of the server assembly 40 via a communication network 30. The communication network 30 may include multiple embodiments such as, WLAN wireless local area network, wireless data communication such as LTE long term evolution, 5G, or 6G, a wired ethernet connection, or any other suitable communication network as known in the art.

The server 44 may include a group of components for generating a machine learning script for real estate purposes. The server 44 may include a processor 41, a user interface 42, a memory 43. The user interface 42 may take the form of a command line interface, a graphical user interface, a voice interface, or a web-based interface. It may be preferable for the memory 43 to be embodied as a hard drive, a network attached storage, or other type of machine-readable medium for the storage of electronic instructions. In one iteration of the present invention 10, databases 140 may be stored within the memory 43 of the server 44. The database 140 may further include a session database 141, a heatmap database 142, an auditory database 143, a seller input database 144, an aesthetic database 145, a customization selection database 146, a behavior pattern database 147, a sale record database 148, a user ID database 149, and a demographic database 151. Best shown in FIG. 2, modules 60 may also be stored within the memory 43. Wherein the modules 60 may further include a user ID module 61, a staging module 62, a customization module 63, a recording module 64, a heatmap module 65, an auditory module 66, a machine learning module 67, a sale probability module 68, a voice recording module, an identification module, a path generating module. In yet another embodiment, the present invention may include eyes tracking recognition, pupil dilatation recognition, user's temperature recognition, galvanic skin response (GSR) information, or the like.

In one embodiment a user may login to the user interface 42 by manually entering demographic information, behavioral and/or attitudinal information. The information may include but is not limited to name, age, marital status, household income, employment, ethnicity, primary language, family size, gender, purpose of the visit, technology affinity, or buying preferences. The demographic information may be saved to the demographic database 151 located on the memory of the server 44 for future access. A property seller or a real estate agent may also utilize the user interface 42 to input additional information to be saved to the seller input database 144. The additional information saved to the seller input database 144 may include user preferences that are dictated to the real estate agent by the user that may not be included in demographic database 151. The memory 43 located on the server 44 may also be a storage location for the real estate database 152. Wherein the real estate database 152 may include property locations, property layout, property style, stating, furniture layout configuration, finishes, property amenities, or any other variation of property features.

The memory 43 may also include a user ID module 61. The user ID module 61 may generate a unique identifier in the form of a user ID. The user ID may be generated after a user has entered their demographic information into the user interface 42. After logging in via the user interface 42 the staging module 62 stored on the memory 43 compiles data from the demographic database 151, seller input database 144, and the real estate database 152 to virtually render a real estate space. The staging module 62 may render the real estate space in real time to be displayed on the VR headset 22, the computer 24, or mobile device 26 via the communication network 30. The rendering process may be done locally by each handset 22 or streamed wirelessly from a local computer or directly streamed from the cloud. In the present embodiment a user may wear a VR headset 22 to begin a virtual exploration session of the real estate space. The staging module 62 may also allow the virtual exploration session to be tailored for a user depending on the demographic information entered into the demographic database 151. For example, a user with two children may prompt the staging module to decorate the extra bedrooms in the virtually rendered real estate space with children's themes and or children furniture.

The customization module 63 may allow for a user to manually select visual options for the virtually rendered real estate space via the user interface 42. The customization module 63 may call upon an aesthetic database 145 saved in the memory 43 to acquire aesthetic data for possible furniture styles, paint colors, floor finishes, appliances, or any variation thereof. The visual options that have been selected may then be saved within the customization selection database 146. A recording module 64 may allow for the virtual exploration session to be recorded by streaming session data to be saved to the session database 141 via the communication network 30.

It may be suitable for the session data to be converted into heatmap data via the heatmap module 65 stored in the memory 43. The heatmap module 65 may generate a visualization based on heatmap data. The visualization may depict the intensity of data located about the virtually rendered real estate space that was recorded during the virtual exploration session. The heatmap data may include time user spent looking at features of the real estate space, time user spent in certain area of the rendered real estate space, frequency a user explored a feature of a real estate space, or any variation thereof. The heatmap data may then be saved onto the heatmap database 142. It may be suitable for auditory data to be extracted from the session data via an auditory module 66. The auditory module 66 may include speech recognition features and allow for a user's vocal reactions to their virtual exploration session to be saved within the auditory database 143 located on the memory of the server in the form of auditory data.

A machine learning module 67 may process data from the heatmap database 142, auditory database 143, and the customization selection database 146 to recognize and establish a behavioral pattern and save the behavioral data to a behavioral pattern database 147. The behavioral pattern database 147 and the sale record database 148 may then be cross referenced by the sale probability module 68. The sale probability module 68 may use the user ID to identify current and previous users and match behavioral data to sale outcome data saved to the sale record database 148. The sale probability module 68 may then compare the current behavioral data to previous behavioral data saved to the behavioral pattern database 147. The sale probability module 68 may assign a numerical score or a percentage by directly correlating the behavioral pattern of the current user to the previous user and their sale outcome. Thereby establishing the likelihood of the same sale outcome occurring.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for generating a marketing and sales script for real estate, comprising:
   a virtual reality headset or other computerized devices in communication with a server via a network, said server containing a database with behavioral pattern and demographic parameters, said server further contains at least one software that includes a sale probability module that uses machine learning algorithms that works with behavioral pattern and demographic parameters in databases and said at least one software also includes a staging module that uses machine learning algorithms that works with behavioral pattern and demographic parameters to predict staging options, users enter demographic and behavioral information into said at least one software, said at least one software containing instructions that when read by the processor cause the system to:
   a) match said behavioral pattern and demographic parameters located in said server database with said user entered demographic and behavioral information to present staging options to said users;
   wherein said users then provide changes to predicted staging options, said machine learning module measures differences between initial prediction with final staging layout after user changes;
   wherein said learning module works to reduce said differences by providing subsequent staging option predictions that would be more accurate for subsequent users based on analyzing changes made by users;

wherein said predicted staging layouts viewable by said virtual reality headset or said other computerized devices;

b) record behavioral data obtained from a virtual exploration session of the virtual real estate space displayed on the virtual reality headset to establish a heatmap for business intelligence purposes;

said heatmap is generated based on the location where a user from said users went within the virtual real estate space and/or for how long said user stayed, looked at, and/or interacted with a particular area and/or object within said virtual real estate space;

wherein said heatmaps are used to generate subsequent predicted staging options, said heatmaps are also used to generate a real estate sales script;

c) based on where the user goes in the virtual real estate space displayed on the virtual reality headset and for how long and how much said user interacts with an object in said virtual real estate space;

wherein the sale probability module predicts the probability the user will purchase said real estate and said probability is included in the real estate script.

2. The system in claim 1 wherein an experience is recorded and sent to the user as part of the customer marketing package that includes information about the property that said user has visited.

3. The system of claim 1 wherein said virtual reality headset is calibrated by inserting it into a custom or proprietary table that helps the system to determine where the headset is within the virtual reality space, the system knows where the table is and the dimensions of the room and once the headsets are locked into the table the system knows where the headsets are in the room and with respect to other headsets locked into other tables throughout the room, thereby preventing users from walking into each other and keeping users within physical parameters of a given space in which the virtual reality space is depicted.

* * * * *